(12) United States Patent
Devaraju et al.

(10) Patent No.: US 11,281,281 B2
(45) Date of Patent: Mar. 22, 2022

(54) CONTROLLING A PROCESSING PERFORMANCE LEVEL DEPENDING ON ENERGY EXPENDITURE

(71) Applicant: Intel Corporation, Santa Clara, CA (US)

(72) Inventors: Jayanth M. Devaraju, Hillsboro, OR (US); Vivek De, Beaverton, OR (US); Sriram Vangal, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 97 days.

(21) Appl. No.: 16/956,447

(22) PCT Filed: Feb. 28, 2018

(86) PCT No.: PCT/US2018/020272
§ 371 (c)(1),
(2) Date: Jun. 19, 2020

(87) PCT Pub. No.: WO2019/168528
PCT Pub. Date: Sep. 6, 2019

(65) Prior Publication Data
US 2021/0081017 A1     Mar. 18, 2021

(51) Int. Cl.
*G06F 1/32*     (2019.01)
*G06F 1/3206*     (2019.01)
(Continued)

(52) U.S. Cl.
CPC ............ *G06F 1/3206* (2013.01); *G06F 1/324* (2013.01); *G06F 1/3296* (2013.01)

(58) Field of Classification Search
CPC ....................................................... G06F 1/32
See application file for complete search history.

(56) References Cited

U.S. PATENT DOCUMENTS

2003/0126479 A1    7/2003    Burns et al.
2006/0095807 A1    5/2006    Grochowski et al.
(Continued)

FOREIGN PATENT DOCUMENTS

WO    2019/060126    3/2019

OTHER PUBLICATIONS

International Patent Office—International Search Report and Written Opinion dated Nov. 22, 2018, from International Application No. PCT/US2018/020272, 12 pages.

*Primary Examiner* — Paul B Yanchus, III
(74) *Attorney, Agent, or Firm* — Schwabe, Williamson & Wyatt, P.C.

(57) ABSTRACT

Circuitry is provided to control a performance level of a processing device depending on two or more operating points of the processing device. An operating point has a corresponding frequency and a corresponding voltage. The performance-level control circuitry arranged to cross-multiply parameters corresponding to a first operating point and a second, different operating point of the processing device. A relative energy expenditure of the first operating point and the second operating point is determined based on the cross multiplication. An operating point of the processing device is selected depending on the determined relative energy expenditure. An apparatus having the performance level control circuitry, machine readable instructions for implementing the performance level control and a corresponding method are also provided.

24 Claims, 6 Drawing Sheets

(51) Int. Cl.
    *G06F 1/324*         (2019.01)
    *G06F 1/3296*      (2019.01)

(56) References Cited

U.S. PATENT DOCUMENTS

| | | |
|---|---|---|
| 2007/0016814 A1 | 1/2007 | Rusu et al. |
| 2008/0082844 A1 | 4/2008 | Ghiasi et al. |
| 2012/0159496 A1* | 6/2012 | Dighe .................. G06F 1/3206 718/102 |
| 2013/0103956 A1* | 4/2013 | Murakami ............. G06F 9/505 713/300 |
| 2014/0380071 A1 | 12/2014 | Lee et al. |
| 2017/0177056 A1* | 6/2017 | Tumquist ................ G06F 1/324 |
| 2019/0094897 A1 | 3/2019 | Vangal et al. |

* cited by examiner

Figure 6

CONTROLLING A PROCESSING PERFORMANCE LEVEL DEPENDING ON ENERGY EXPENDITURE

CROSS REFERENCE TO RELATED APPLICATIONS

This application is a national phase entry under 35 U.S.C. § 371 of International Application No. PCT/US2018/020272, filed Feb. 28, 2018, entitled "CONTROLLING A PROCESSING PERFORMANCE LEVEL DEPENDING ON ENERGY EXPENDITURE," the entire disclosure of which is hereby incorporated by reference.

TECHNICAL FIELD

Embodiments described herein generally relate to the field of power management of digital circuits, and more particularly, to managing a performance level of a processing device to reduce energy consumption.

BACKGROUND

Improving the energy-efficiency of digital circuits is one important objective in integrated circuit design. For example, energy-efficiency is important in determining the size and weight of battery-operated electronics, but there is also an incentive in larger processing devices such as servers to drive down power consumption to reduce energy bills. Supply voltage (Vcc) scaling is an effective technique for reducing energy consumption and this may involve reducing Vcc when the processing workload reduces. Many modern processing devices are arranged to execute at a plurality of different operating frequencies and voltages. For example, one or more reduced-power sleep modes may be implemented, where the device is operating at a reduced power but not switched off, pending an increase in processing workload.

For energy-constrained applications, operating at a minimum energy point having a relatively low operating voltage and frequency makes sense. It is known to define a minimum energy point (MEP) at which a total energy consumed per desired operation of a digital circuit is minimized. In this document, terms such as "minimum" and "optimum" may be the perceived rather than the absolute minimum and optimum values, in that they may relate to the best observed values taking into account any measurement limitations. Switching energy of digital circuits reduces quadratically as Vcc is decreased below a threshold voltage, $V_T$, but leakage energy actually increases exponentially below $V_T$. These opposing trends result in the MEP. Any relative increase in an active energy component of a digital circuit due to an increase in workload or activity of the circuit may decrease the minimum energy operating voltage. On the other hand, a relative increase of a leakage energy component due to, for example, an increase in temperature can push up the MEP operating voltage. The best energy efficiencies for Complementary Metal-Oxide Semiconductor devices may be achieved in a near-threshold voltage regime with an optimum supply voltage $V_{opt}$ and an optimal supply frequency $F_{opt}$ and at the MEP, where energy efficiencies may be five to ten times better than at a nominal supply voltage operation.

Since the MEP and $V_{opt}$ and $F_{opt}$ can vary considerably with factors such as process fabrication variations, processing workload and temperature, it follows that adaptive adjustment of $V_{opt}$ and $F_{opt}$ to account for changes in the MEP during operation of processing device operation has the potential to significantly reduce energy consumption and thus to improve processor efficiency.

BRIEF DESCRIPTION OF THE DRAWINGS

Embodiments described herein are illustrated by way of example, and not by way of limitation, in the figures of the accompanying drawings in which like reference numerals refer to similar elements.

DESCRIPTION OF EMBODIMENTS

Illustrative embodiments of the present disclosure include, but are not limited to, methods, systems and apparatuses and machine-readable instructions for peak power determination in integrated circuit devices.

Figure 1:
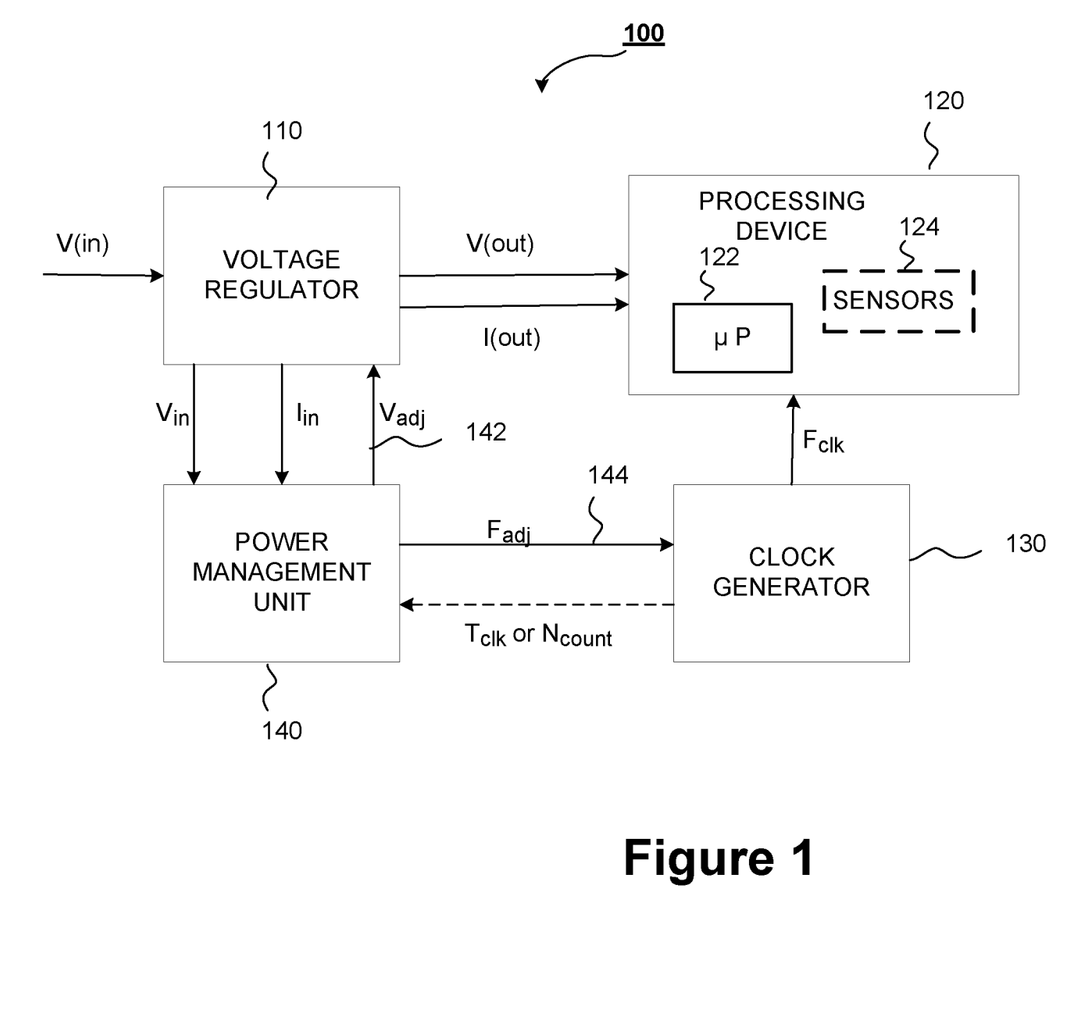
FIG. 1 schematically illustrates an energy management system for a processing device.

FIG. 1 schematically illustrates an energy management system, according to one example implementation. A voltage regulator (VR) 110 may receive an analogue input voltage V(in) and convert it to a variable analogue output voltage V(out), which may be used to provide energy to a digital data processing device 120. The data processing device 120 may comprise a microprocessor 122 and optionally, one or more sensors 124 such as, for example a temperature sensor. In other examples sensors may be locates in other system components such as in the clock generator 130. In some examples, the VR 110 may also be used to provide energy to at least one of the PMU 140 and the Clock Generator 130.

When connected in this manner, these components may also be included in determining a minimum energy consumption for the system 100.

Within this document, the parentheses used in the terms 'V(in)' and 'V(out) indicates that these are analogue voltage values. The remaining signal terms such as $V_{in}$ and $I_{in}$ in FIG. 1 (without such parentheses) may be digital values, suitable for processing by digital circuitry. In some examples, the blocks 110, 120, 130 and 140 of FIG. 1 may be considered functional blocks rather than physical blocks, and the circuitry of two or more of the blocks may be integrated together to combine at least some functionality for implementation in a hardware processing circuitry unit.

In some examples, the VR 110 may be a switched capacitor voltage regulator (SCVR), but other examples may use other types of VRs, such as but not limited to inductor based buck or linear drop-out (LDO) implementations. V(in)

may come from any suitable source, such as but not limited to a battery, an Alternating Current to Direct Current (AC-DC) energy supply, a DC-DC converter, etc. The voltage level of V(out) may be adjusted as needed in an attempt to reduce overall energy consumption. Clock generator 130 may output a clock signal Fclk with a variable frequency to operate the digital circuitry such as the microprocessor 122 in the processing device 120. In some examples, the clock generator 130 may comprise a phase locked loop (PLL). The microprocessor 122 may be arranged to operate at any one of a plurality of different operating points, each operating point having a characteristic frequency, Fclk, and voltage, V. The microprocessor 122 may be controlled by the PMU 140 to operate at different performance levels by, for example, first increasing the operating voltage and then increasing the operating frequency to a maximum value appropriate for the new voltage. Alternatively, the frequency may be decreased to a lower operating point and then the voltage can then be reduced accordingly.

Figure 2:
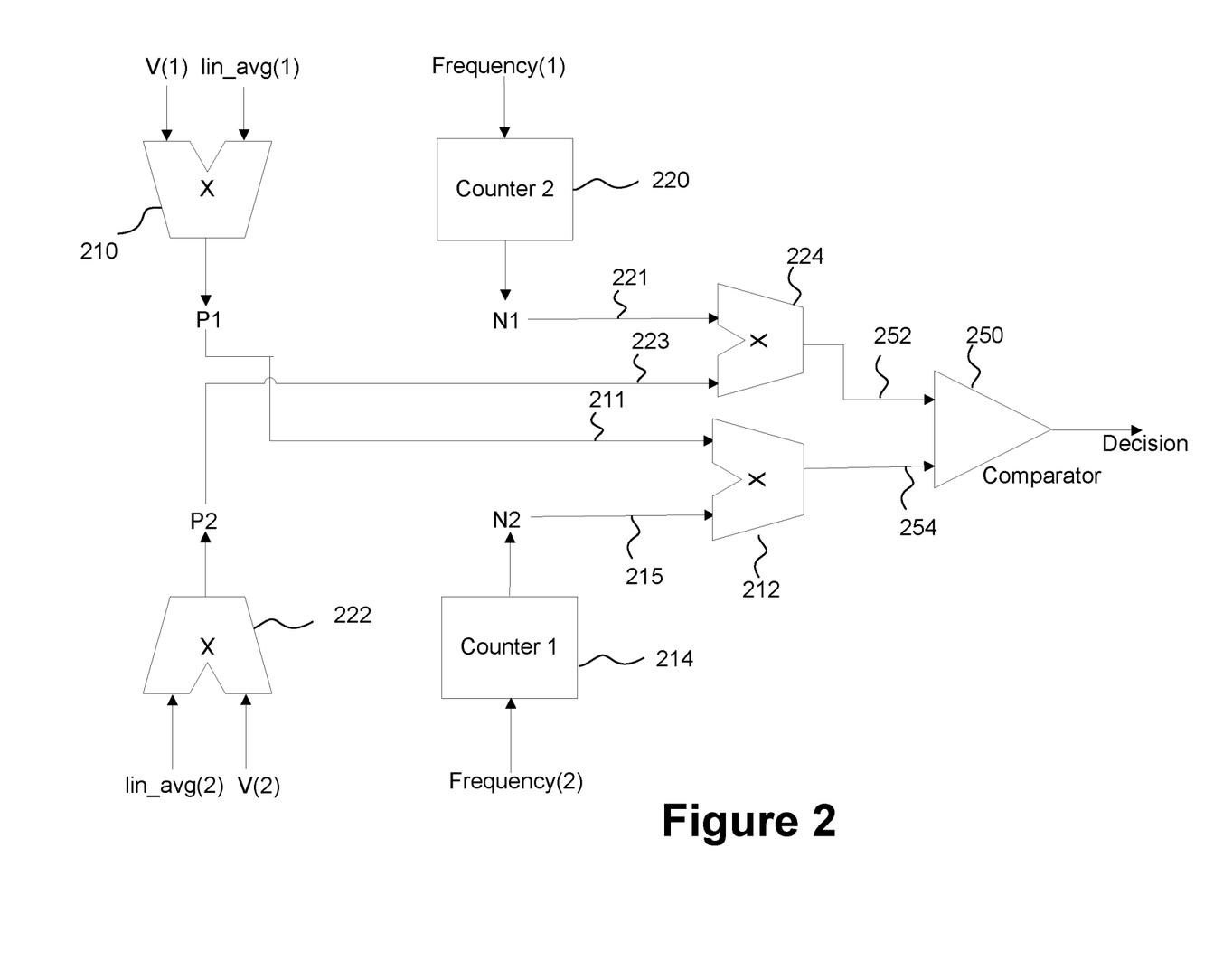
FIG. 2 schematically illustrates an example circuit to perform a dual-point stride energy per operation comparison to determine a relative energy of two operating points.

The PMU 140 is arranged to receive an input, $V_{in}$, from the VR 110, an input $I_{in}$ from the VR 110 representing the digital value of I(in), where I(in) is an input current to the VR corresponding to V(in). The PMU 140 is also arranged to receive from the Clock Generator 130, an input Tclk indicating a current clock frequency of the microprocessor 122. These values may be used by the PMU 140 to determine an energy per operation ($E_{per\ op}$) being consumed by the apparatus 100 according to formula (1):

$$E_{per\ op} = \frac{V_{in} * I_{in\_avg} * n_{cycles}}{F_{clk}} = \frac{P * n_{cycles}}{F_{clk}} = P * n_{cycles} * T_{clk} \quad (1)$$

where $V_{in}$ may represent the digital value of V(in), $n_{cycles}$ may represent a predetermined number of one or more clock cycles corresponding to an "operation", $I_{in\_avg}$ may represent the digital value of the average current into the VR 110 over multiple operations (not necessarily the same number of operations corresponding to $n_{cycles}$), $T_{clk}$ may represent the time period corresponding to a reciprocal of the clock frequency ($F_{clk}$) and P may represent a power expenditure corresponding to contemporaneous values of $V_{in}$ and $I_{in\_avg}$. The value of $I_{in\_avg}$ may be provided to the PMU 140 by the VR 110 via current telemetry. Within the context of this specification, an 'operation' may be defined as a single clock cycle corresponding to the currently set clock frequency $F_{clk}$, or may alternatively correspond to two or more such clock cycles, typically the number of clock cycles it takes to complete a unit of task, or another defined period of time that is consistent throughout the process of determination of an energy of operation for different operating points. Values for $V_{in}$, $I_{in\_avg}$, $n_{cycles}$, $F_{clk}$ and $T_{clk}$ may all be in digital format so that formula (1) may be computed digitally. In equation (1) the values of $V_{in}$ and $I_{in\_avg}$ may be replaced by $V_{out}$ and $I_{out\_avg}$ to determine an energy per operation for the processing device 120, excluding other components like the voltage regulator 110. According to previously known methods of determining the MEP, a reciprocal calculation to determine $T_{clk}$ from $F_{clk}$ would have been performed. However, according to the present technique the reciprocal calculation can be eliminated so that $T_{clk}$ can be replaced by a simple frequency count. This means that an expensive reciprocal calculation unit or look-up tables can be eliminated from the circuit and instead may be replaced by one or more inexpensive and simple-to-implement frequency counter. The frequency counter (see FIG. 2) may be provided in the clock generator 130, in the PMU 140 or in the processing device 120. As will be explained below, according to the present technique, specific values of $E_{per\ op}$ need not be explicitly calculated, but they can be calculated indirectly to determine a relative energy per operation for pairs of different operating points.

The product of $V_{in}$ and $I_{in}$ represent power into the VR 110 and thus the formula (1) may in some examples automatically include energy consumed by the VR 110 itself plus energy consumed by any components powered by the VR 110, which may include at least one of the clock generator 130 and the PMU 140. Thus any changes in an efficiency of the VR 110 may be automatically accounted for when seeking minimum energy consumption for the system. Calculation of the value $E_{per\ op}$ in formula (1) involves calculation of a reciprocal ($1/F_{clk}$) where $F_{clk}$ is typically a large number, for example a number of MHz, and this denominator in equation (1) is orders of magnitude larger the numerators, P and $n_{cycles}$. In some examples, the reciprocal calculation may use 64 bit floating point numbers. Such reciprocal calculations can introduce latency of multiple processing cycles and can thus represent a bottleneck in determination of an MEP. According to the present technique, instead of calculating an $E_{per\ op}$ for each processing device operating point (Vcc, $F_{clk}$), pairs of operating points are used to determine a relative magnitude of the $E_{per\ op}$ for the pair of points and this relative magnitude may be used to select a new operating point to reduce (or increase) energy consumption. Instead of performing a reciprocal calculation for each $F_{clk}$, a frequency counter is used to integrate a number of counts in a given reference clock period (the same reference clock period for different values of $F_{clk}$).

A relative magnitude of the $E_{per\ op}$ is determined by taking account of the following cross-multiplication of values corresponding to two different operating points indexed by non-zero integer i=1,2.

$$E_{per\ op}(i) \alpha \frac{Pi}{Ni} \quad (2)$$

$$E_{per\ op}(1) > E_{per\ op}(2) \Rightarrow \frac{P1}{N1} > \frac{P2}{N2} \text{ so } P1*N2 > P2*N1 \quad (3)$$

Where Ni is a frequency count in a reference interval at $F_{clk}i$ and where $Pi=V_{in}*I_{in\_avg}$ as for equation (1). Based on the energy per operation, $E_{per\ op}$, or otherwise, power to the processing device 120 may be adjusted by sending a $V_{adj}$ signal 142 to the VR 110 to change V(out). If N1 and N2 are the same or very close to each other, then the calculation may be further simplified by comparing only P1 and P2. Power may alternatively or additionally be adjusted by sending an $F_{adj}$ signal 144 to the Clock Generator to adjust the clock frequency. Selection of operating frequency may take account of the selected operating voltage to avoid processing device failure. There is a maximum operating frequency that a given supply voltage can reliably support. In this way, energy consumption may be changed, incrementally or otherwise, by adjusting voltage and/or frequency. Operating frequency and voltage may, for example, be increased to accommodate an increase in workload or $V_{out}$ may be adjusted incrementally in the region of a threshold voltage of transistors of the processing device 120 to explore the MEP for a present workload. Changes in energy consumption by varying operating point parameters may, in turn, be examined to determine if these changes are increasing or decreasing overall energy consumption, based on the $E_{per\ op}$ calculated indirectly using formula (3) to determine a relative energy expenditure per operation via a cross-multiplication of power and frequency count values at two different frequency and voltage operating points ($F_{clk}1$, $V_{out}1$; $F_{clk}2$,$V_{out}2$) without actually calculating a value of $E_{per\ op}$ at a single point.

The sensors 124 of the processing device may be used to measure temperature, voltage, current, frequency, etc., as well as optionally taking other measurements that may not be directly related to controlling energy consumption, and may provide these measurements to the PMU 140 for calculation of the MEP. Dynamic adjustment of the MEP may be triggered by a re-evaluation of the MEP and associated optimal operating point depending on any change in operating conditions detected by the sensors 124. One example is to measure when V(out) or I(out) has dropped below an acceptable level and send a signal to the PMU 140 to adjust its tracking method and to increase power rapidly to ensure continued reliable operation of the processing device 120. The sensors 124 may sense an on-die temperature of the processing device 120 and any detected change in temperature or a change by more than a threshold amount or above or below a threshold value may trigger the PMU 140 to re-scan the parameter space and re-lock to a new $V_{opt}$ value corresponding to a new MEP. These sensors 124 may be coupled to the other components in ways not shown. In some embodiments, all the components shown in FIG. 1 may be integrated into a single semiconductor die, without the need for additional external components.

FIG. 2 schematically illustrates an example circuit to perform the dual-point stride MEP calculation according to the present technique. The circuit comprises a first multiplier 210, a second multiplier 212, a third multiplier 222, a fourth multiplier 224, a first counter 214, a second counter 224 and a comparator 250. A first subset of circuitry comprising a combination of the first multiplier 210, the second multiplier 212 and the first counter 214 calculates one of the two cross products of equation (3) comprising P1*N2. A second subset of circuitry comprising a combination of the third and fourth multipliers 222, 224 and the second counter 220 is arranged to calculate the other cross-product, P2*N1, of equation (3). The first subset of circuitry and the second subset of circuitry each contain identical components and thus in one alternative example, one of the two subsets of circuitry may be eliminated and a serial calculation may be performed to determine P1*N2 and P2*N1 in turn, with a comparison on the two cross-products being calculated subsequently.

Further examples may implement different circuit components from those illustrated in FIG. 2 and yet capable of performing the calculation of equation (3). For example, a multiplier 210 may be implemented by a plurality of logical adders.

The first multiplier 210 calculates the product $V_{in}(1)*I_{in\_avg}(1)=P1$ corresponding to a first operating point whereas the third multiplier 222 calculates product $V_{in}(2)*I_{in\_avg}(2)=P2$ corresponding to a second operating point when determining power consumption and perhaps the MEP for the entire system 100 including the voltage regulator 110, power management unit 140, clock generator 130 and processing device 120. This has the benefit of taking into account the voltage regulator 110 efficiency across the entire operational range and is a system-wide optimization. However, in alternative examples when determining power consumption of the processing device 120 alone, the first multiplier 210 calculates the product $V_{out}(1)*I_{out\_avg}(1)=P1$ corresponding to the first operating point whereas the third multiplier 222 calculates product $V_{out}(2)*I_{out\_avg}(2)=P2$ corresponding to the second operating point. This does not take into account the non-linear (or non-monotonic) efficiency of many voltage regulators. Thus the values Vin and Iin may be used for system power and MEP determinations whereas the values Vout and Iout may be used for processing device power and MEP determinations. The two different operating points correspond to two different points in time. Thus to perform the double-stride MEP calculation of equation (3), buffering or delay of values corresponding to the operating point that is captured earliest until the second operating point values are available is appropriate. When both sets of counts and powers are available can the comparison of relative power be made. The first counter 214 is a frequency counter that counts a number of $F_{clk}(2)$ signals for the second operating point in a predetermined reference clock period and thus determines the value N2 in equation (3). The second counter 220 is a frequency counter that counts a number of $F_{clk}(1)$ signals for the first operating point in a predetermined reference clock period and thus determines the value N1 in equation (3).

The second multiplier 212 receives a first input 211 corresponding to the value $V_{in\ or\ out}(1)*I_{in\ or\ out\_avg}(1)=P1$, supplied as output by the first multiplier 210 and also receives as a second input 215, the count value N2 and thus calculates the cross product P1*N2. The fourth multiplier 224 receives one input 223 corresponding to the value $V_{in\ or\ out}(2)*I_{in\ or\ out\_avg}(2)=P2$ supplied as output by the third multiplier 222 and receives as a further input 221 the count value N1 determined by the second frequency counter 214 and thus calculates the cross product P2*N1.

Figure 6:
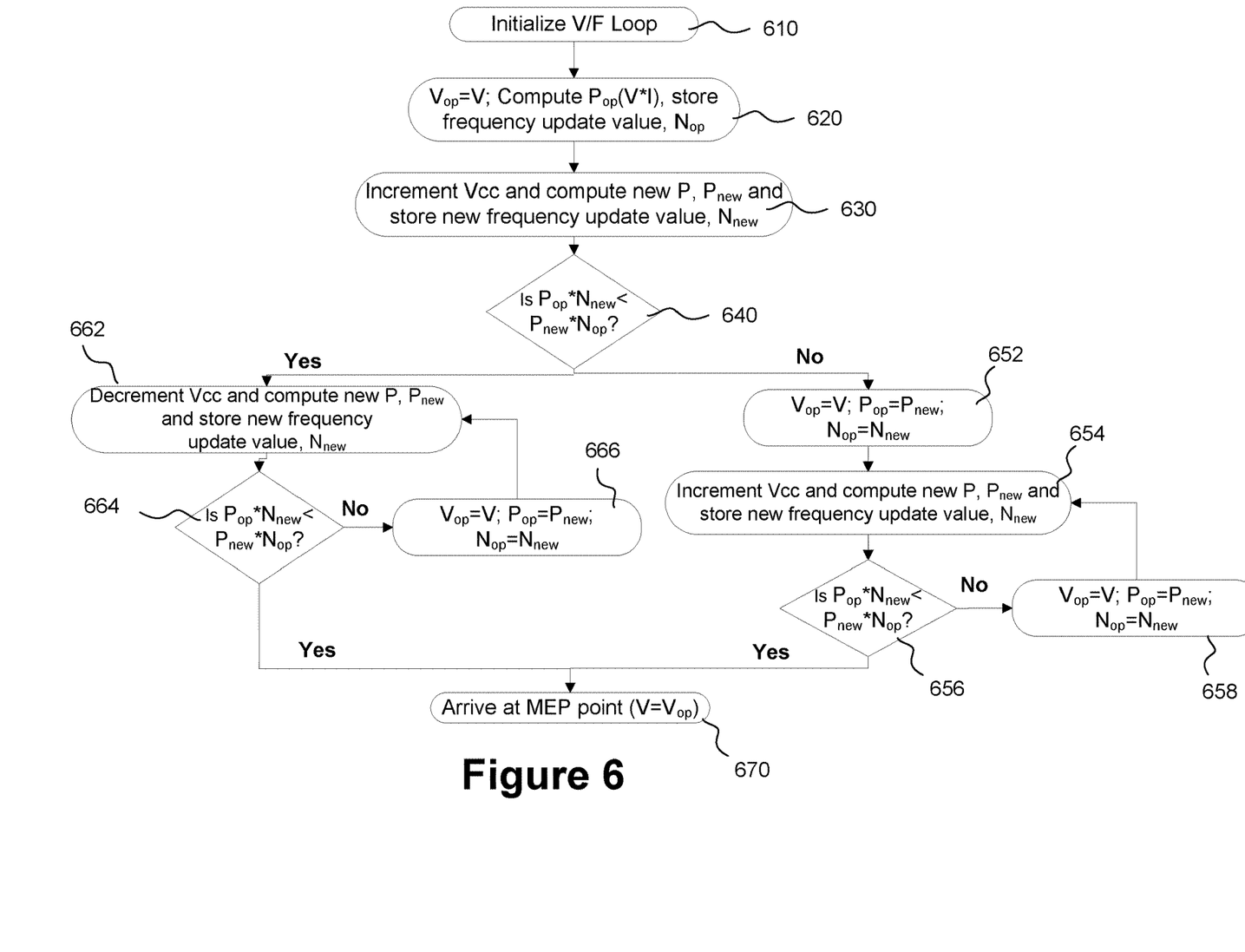
FIG. 6 is a flowchart schematically illustrating a path taken to determine a final Minimum Energy Point with optimal voltage, $V_{op}$, and processing frequency, $F_{op}$, for a processing device.

The comparator 250 is arranged to receive a first input 252 from an output of the fourth multiplier 224 and corresponding to P2*N1 and to receive a second input 254 from an output of the second multiplier 212 and corresponding to a value P1*N2. An output of the comparator 250 corresponds to a decision regarding whether or not P1*N2>P2*N1, which is equivalent to a decision as to whether or not $E_{per\ op}(1)>E_{per\ op}(2)$. Seeking the lowest value of $E_{per\ op}$ allows the MEP to be determined via an iterative process as illustrated in FIG. 6.

In previously known implementations that would calculate the reciprocal frequency, the counters 214, 220 of FIG. 2 would not be present, but more complex reciprocal calculation circuits would be used instead.

Figure 3:
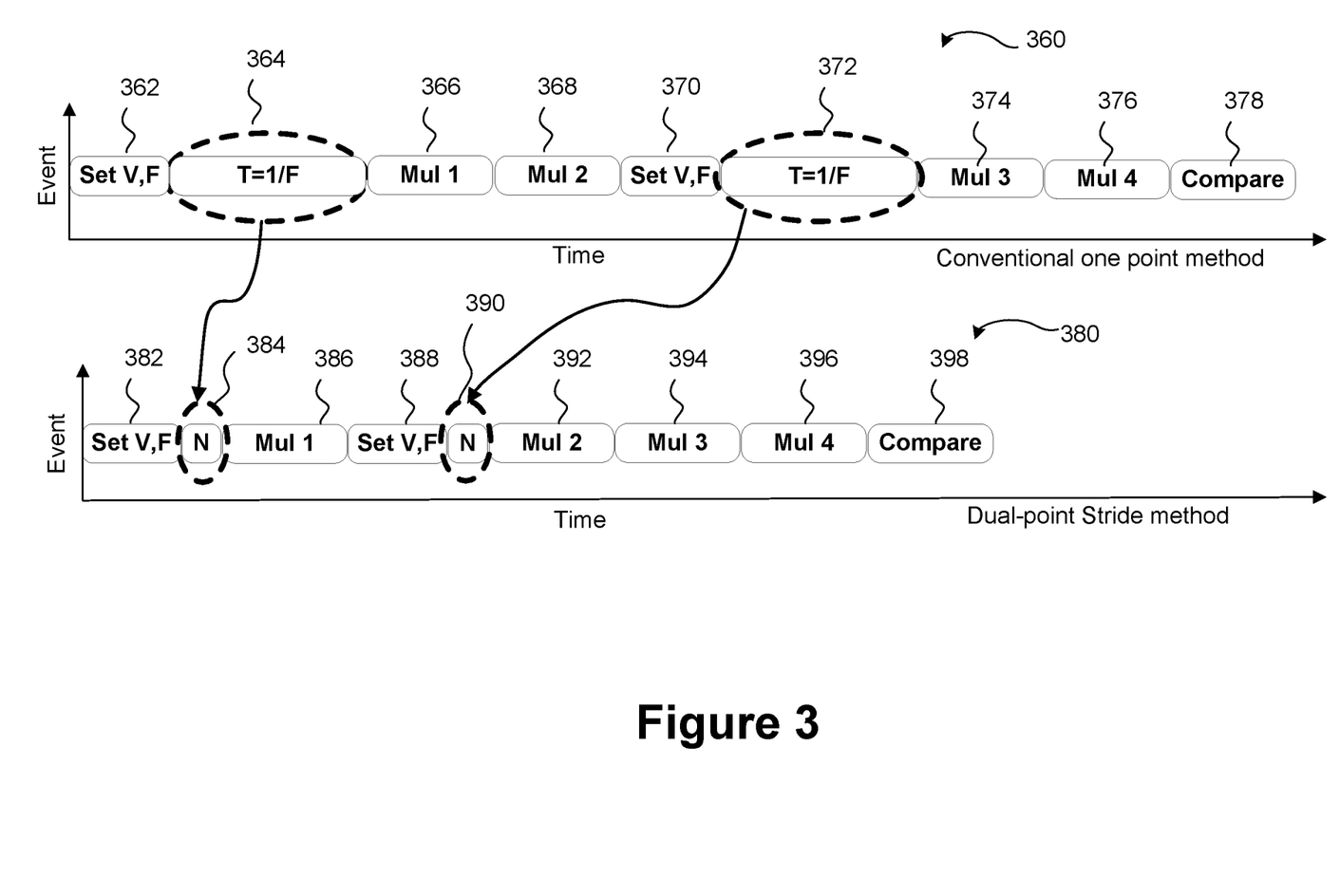
FIG. 3 schematically illustrates how the example circuit of FIG. 2 can reduce computation time relative to a previously known technique by eliminating a multi-cycle reciprocal calculation.

FIG. 3 schematically illustrates how the example circuit of FIG. 2 can reduce computation time relative to a previously known technique comprising specifically calculating an energy per operation value for each data point and requiring a reciprocal calculation to determine an operation period from the clock frequency. A first event versus time series 360 in FIG. 3 shows a sequence of events performed in performing a comparison of two processing device operating points using the formula of equation (1) above. This can be contrasted with a second event versus time series 380 in FIG. 3 showing a sequence of events performed in calculating a difference in energy expenditure between two operating points of the processing device according to the dual-point stride method of the present technique.

Considering the first event sequence 360 of FIG. 3, at event 362 a first voltage and frequency (F1,V1) are set for the processing device and then at event 326, a reciprocal calculation (1/F1) is performed to determine a period, T1, from the currently set processing frequency. Next at event 366 a first multiplication is performed to calculate a first power value, P1, from the input voltage and the average input current at the first operating point and then a second multiplication is performed at event 368 to multiply the period (1/F1) determined at event 364 by the first power value, P1, determined at event 366 and thus to calculate an $E_{per\ op}(1)$ for the first operating point. Next at event 370, a second processor voltage and operating frequency (V2, F2) are set different from the values V1 and F1 set at event 362. Then at event 372 reciprocal of the second frequency (1/F2) is calculated to determine a period relevant to the second processor operating point. Then at event 374 a third multiplication is performed to calculate a second power value, P2, and subsequently at event 376 a fourth multiplication is performed to calculate a product of P2 and the reciprocal (1/F2) calculated at event 372 to determine $E_{per\ op}(2)$. Finally, at 378 a comparison is performed of $E_{per\ op}(1)$ and $E_{per\ op}(2)$ to determine which operating point corresponds to the lowest energy expenditure to facilitate identification of the MEP.

Now considering the second time sequence 380 of FIG. 3, which begins at event 282, a first frequency and voltage of the processor is set and then at event 284, a frequency count of $F_{clk}$ is performed within a reference clock period. A first multiplication is then performed at event 386 to calculate a first power value, P1, and then at event 288 the operating point of the processing device is changed to set a new operating voltage and a new operating frequency. Next at event 390, a frequency count is performed within the same reference clock as at event 384 but for the new $F_{clk}$. A second multiplication is performed at event 392 to calculate a power, P2, at the second operating point and then at event 294 third multiplication is performed to calculate the product of P1 and N2 and then a fourth multiplication is performed at event 396 to calculate the other cross product of equation (3) comprising P2*N1. Finally, at event 396 a comparison is performed of the two cross products P1*N2 and P2*N1 to determine which of the first and second operating points has the lowest energy per operation according to equation (3) above.

Although a total number of operations is the same in event sequence 360 and event sequence 380, by substituting the computationally expensive reciprocal calculations 364 and 372 by simple frequency counts 384, 390 based on a reference clock, a total duration of the calculation can be considerably reduced, for example, by more than 10 processing cycles. Furthermore, elimination of the reciprocal calculation hardware simplifies the circuitry required to perform the energy per operation comparison and any associated MEP determination.

In the example of time series 380 the reciprocal calculation is eliminated by performing a cross-multiplication of frequency count and power values corresponding to two different operating points of a processing device This cross-multiplication technique may be extended to more than two operating points, treating them in pairs for the purpose of the cross-multiplication. For example, one operating point at a higher voltage and another operating point at a lower voltage relative to a currently selected operating point may be evaluated for power and frequency count to identify a profile (e.g. positive or negative gradient) of an energy versus operating voltage curve in the vicinity of the selected operating points.

Figure 4:
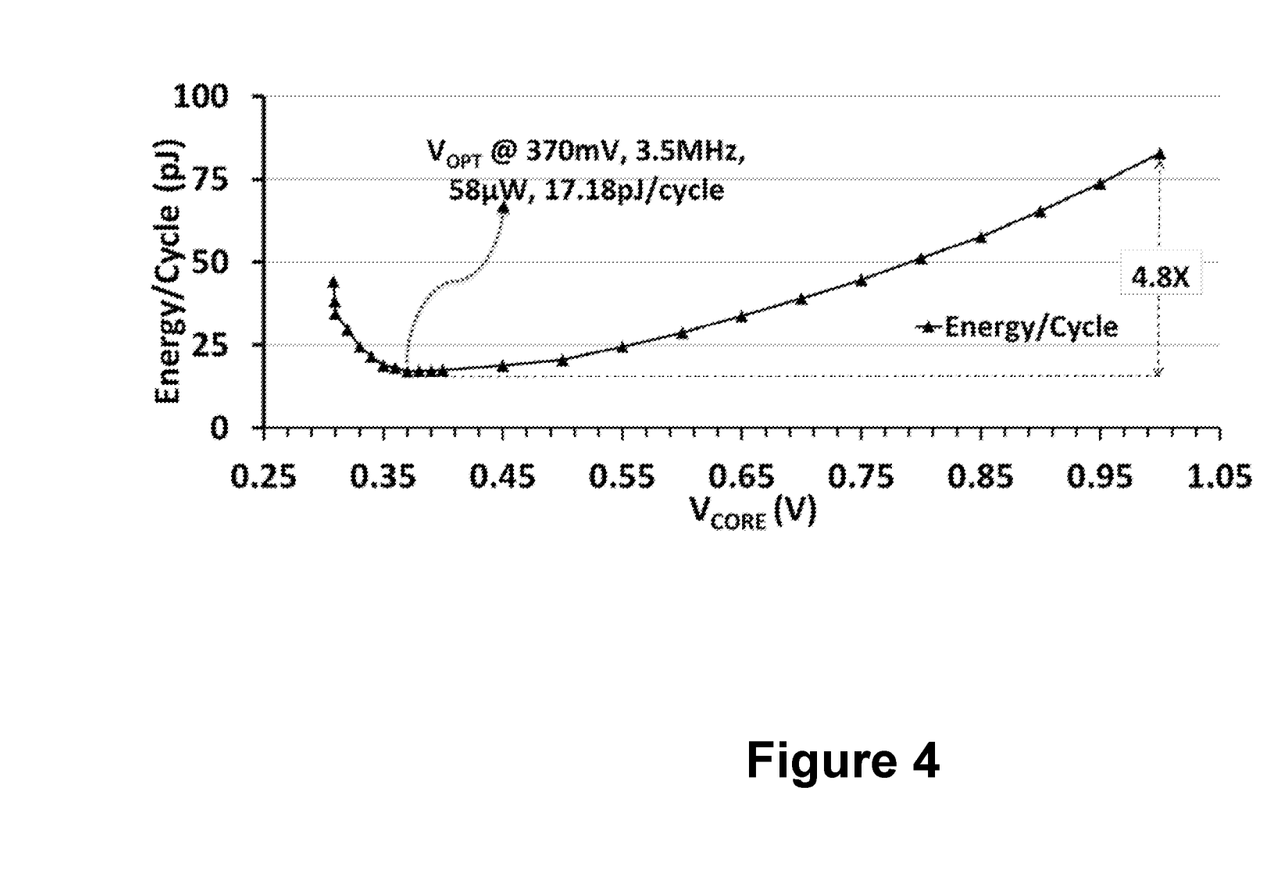
FIG. 4 is a graph schematically illustrating an energy consumption per operation against core voltage for a digital microprocessor for a specific workload.

FIG. 4 is a graph schematically illustrating an energy consumption per operation in pico Joules (pJ) against core voltage for a digital microprocessor for a specific workload. Each data point plotted in the graph of FIG. 4 corresponds to a particular operating voltage and clock frequency of the microprocessor. For each data point plotted, the frequency is set to be the maximum allowable frequency at the corresponding core voltage setting and the frequency Fclk(j) and voltage Vout(j) values for jth data point (j=1, . . . , n) may be set by, for example the PMU 140 of FIG. 1. Thus both the clock frequency and the core voltage may differ for different individual data points. In some examples, the settings of Fclk and Vout may depend on look-up tables derived from pre-characterized silicon data. In other examples, the settings of Fclk and Vout may be adaptively generated using on-die voltage and frequency sensors, such as by using critical path replica circuits. It can be seen from the FIG. 4 example that the $E_{per\ op}$ is a non-linear function of the core voltage and has a characteristic "J" shape (at an angle).

One data point corresponding to an optimal voltage, $V_{opt}$, and thus to an MEP is the data point 410 at the core voltage of 0.37 V in this example. This corresponds to a minimum of the energy versus voltage curve. At voltages higher than $V_{opt}$, the curve has a positive gradient whereas at voltages lower than $V_{opt}$ the curve has a negative gradient. Theoretically, the curve for $E_{per\ op}$ is a non-linear function of the core voltage and this function can be minimized with respect to the core voltage by differentiating and equating to 0. Thus, an analytical solution for the minimum energy operating voltage may be derived. Analytical solutions for the minimum energy operating voltage for a particular circuit show that the $V_{op}$ is not at a fixed voltage but rather that the MEP can vary depends on temperature, workload and possibly other factors.

It can be seen for from FIG. 4 that at a point 420 corresponding to the high core voltage of around 0.99 V, the energy consumed per cycle is around 4.8 times the energy per cycle at the voltage of 0.37V, corresponding to $V_{op}$. In a negative gradient region 430 of the energy per operation curve of FIG. 4, the total energy is likely to be dominated by leakage energy whereas in the positive gradient region (above voltages corresponding to the optimal voltage data point 410), the energy per operation is likely to be dominated by active energy associated with processing workload. The optimal voltage point $V_{opt}$ 410 is likely to be at or close to the threshold voltage region of transistors of the digital circuit.

Figure 5:
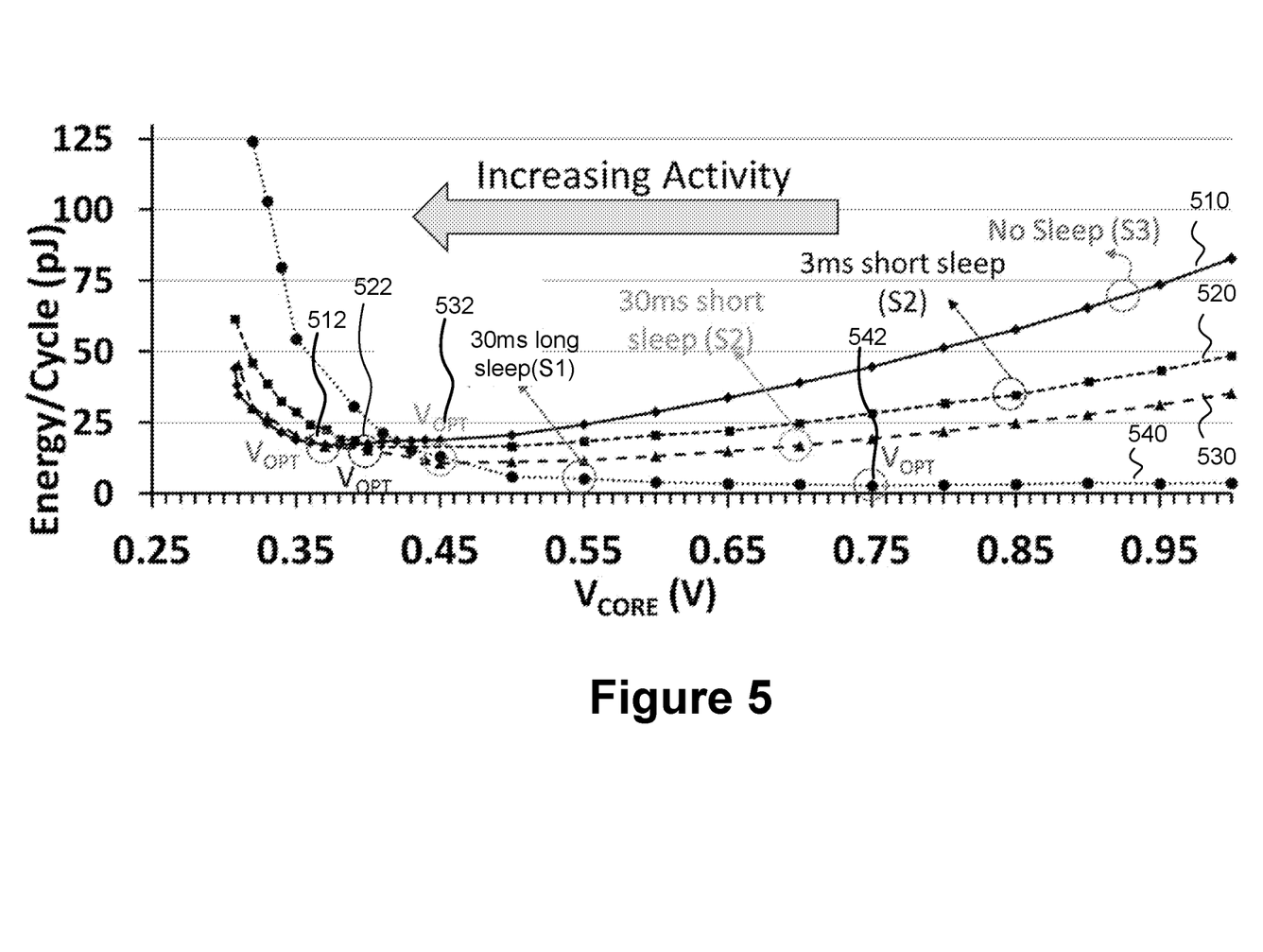
FIG. 5 is a graph of energy per cycle against core voltage schematically illustrating how an optimal voltage point may shift depending on at least one of workload activity and sleep modes of a processing device.

FIG. 5 is a graph of energy per cycle against core voltage schematically illustrating how an optimal voltage point may shift depending on at least one of the workload activity and sleep modes of a processing unit. The different processing modes for which results are plotted in FIG. 5 are non-limiting examples. Indeed, power and sleep modes of a processing device may be implemented in a number of different ways. For example, the "S1" and "S2" modes described below have different clock speeds to keep the processor alive (not completely powered down) in sleep mode, whilst the "S3" mode does not permit a sleep state of the processor. In different modes, different portions of a processing device may be powered down, resulting in relatively different energy consumption per cycle as a function of core voltage. FIG. 5 features four different curves showing how energy per cycle varies with core voltage for different sets of processing parameters. Similarly to the example graph of FIG. 4, the processor frequency is set depending on a maximum frequency that can be supported by the voltage of the respective data point. A first curve 510, on which the data points are represented by diamonds corresponds to the processor not being allowed to enter sleep state and thus corresponds to the maximum processor activity of the four plotted curves. The first curve 510 has an associated optimal voltage point 512 corresponding to around 0.37V. A second curve 520, on which data points are plotted as squares, corresponds to the processor being allowed to enter a 3 ms short sleep in an "S2 mode" when workload permits. The second curve has a corresponding optimal voltage at a data point 522 corresponding to $V_{opt} \cong 0.4V$. A third curve 530, on which the data is plotted with triangles, is for a short sleep mode of 30 ms, also in S2 mode and this curve 530 has a corresponding optimal voltage at data point 532 corresponding to $V_{opt} \cong 0.45V$. A fourth curve 540, on which the data is plotted as circles, corresponds to the processor running in a mode that allows 30 ms long sleep in an S1 mode, which uses a slower clock than S2 mode to keep the system in the sleep mode and hence corresponds to lower activity overall than the 30 ms short sleep (S2) curve 530. The fourth curve 540 has a corresponding optimal voltage point 542 corresponding to $V_{opt} \cong 0.75V$. Theoretically, looking at the constituent leakage current and active energy components of an energy per operation equation leads to the conclusion that any relative increase in an active energy component of the digital circuit due to an increase in the workload is likely to decrease the minimum energy operating voltage. Whereas any relative increase of leakage energy component due to an increase in temperature or duration of leakage over an operation is likely to push the minimum energy operating voltage to go up.

Thus, as one might expect, the data plotted in FIG. 5 show that $V_{op}$ is greatest for the processor mode having no sleep state and hence having the most workload activity and the value of $V_{opt}$ decreases progressively with increasing workload activity of the processor core such that in order of decreasing $V_{opt}$, the processor states are: (i) 30 ms long sleep in S1 mode corresponding to the curve 540, $V_{opt} \cong 0.75V$.; (ii) 30 ms short sleep in S2 mode corresponding to the curve 530, $V_{opt} \cong 0.45V$.; (iii) 3 ms short sleep in S2 mode corresponding to the curve 520, $V_{opt} \cong 0.4V$; and (iv) no sleep corresponding to the curve 510, $V_{opt} \cong 0.37V$. The four different curves 510, 520, 530, 540 and the variation in their corresponding optimal core voltage values 512, 522, 532, 542, suggest that that regular tracking and adjustment of the MEP according to prevailing execution workload and other conditions such as processor temperature is likely to provide considerable energy savings relative to not dynamically adapting the MEP estimate to prevailing processing conditions. Note that the trend in the curves of FIG. 5 is that the positive gradient portion of the curve at voltages above the optimum core voltage decreases in gradient as the processor workload diminishes. For example, the fourth curve 540 has approximately zero gradient even at voltages well below the optimal voltage point 542. In the FIG. 5 example each energy curve 510, 520, 530, 540 has a single minimum corresponding to the optimal voltage. It may also be useful to determine a global minimum, which is an overall minimum for a set of two or more curves. In this example, the global minimum is the point 540 corresponding to the lowest overall activity state.

FIG. 6 is a flowchart schematically illustrating a path taken to determine a final MEP point with estimated optimal $V_{op}$ and $F_{op}$ for a processing device. Functionality of the flow chart of FIG. 6 may be implemented in hardware, in software or by a combination of hardware and software. At 610 the MEP determination is initialized to set an initial processor voltage and processor frequency. The initial voltage may be chosen to be in the vicinity of a threshold voltage of transistors of the digital circuit. Then at 620 the optimum voltage, $V_{op}$, is tentatively set to the initialized voltage and the value of the corresponding power is calculated in accordance with the power calculation in the numerator of equation (1) above. In some examples, the number of clock cycles defining an operation will be a single cycle, but the examples are not limited to this. For simplicity, we shall assume for the FIG. 6 example that $n_{cycles}=1$. As well as calculating $P_{op}=V*I$ at 620, a frequency is count performed to calculate $N_{op}$ in a given reference period at the current clock frequency, $F_{clk}$. When the voltage is initialized, a corresponding maximum frequency supported by the voltage is set at element 610 and this value is stored as the "frequency update value" at 620. The frequency update value may be used to provide a signal to an on-chip oscillator or similar circuit component to update an operating frequency to a maximum frequency value supported at the specific supply voltage currently selected by the power management unit (see FIG. 1). In this example, different operating points of the processing device have parameter pairs comprising a voltage value and a corresponding maximum frequency value, which may be set and changed in lock-step with each other. However, the changes between operating points are not limited to this.

Next at 630 the core voltage, $V_{CC}$, is incremented and a corresponding new trial operating frequency is set and a new frequency update value is stored corresponding to the incremented frequency. In alternative examples, 630 could instead involve decrementing the initial core voltage to determine a new trial voltage. The choice of incrementing or decrementing may be random or may depend on how the core voltage is initialized. Then at element 640 a determination is made whereby a dual-step cross-multiplication is performed according to equation (3) to determine if the values currently set for $P_{op}$ and $N_{op}$ are in fact lower than the new incremented value set $P_{new}$ and $N_{new}$ at 630. In particular, if $(P_{op}/N_{op})<(P_{new}/N_{new})$, it follows that $P_{op}*N_{new}<P_{new}*N_{op}$, which is evaluated at 640. If this condition is satisfied at 640, then the process goes to 662 where Vcc is decremented to define a further new power value and the operating frequency is correspondingly adjusted to be the maximum frequency supported by the updated power value, which is stored as the new frequency update value. A new power, $P_{new}$ is calculated at 662 and also a corresponding new frequency count, $N_{new}$, is performed corresponding to the decremented frequency and the count value may be stored. If the process follows the branch from process element 640 to process element 662 it is likely that (see the energy curve of FIG. 4) the core voltages being explored are on the positive slope of the energy versus voltage curve in the region above the threshold voltage where active energy dominates. This is the reason why the core voltage is decremented at 662 rather than incremented, to move towards rather than away from the curve minimum.

If, on the other hand at 640 it is determined that the previously set optimal power $P_{op}$ results in a greater energy expenditure than the new value set at 620 then the process proceeds to element 652 instead of 662. This is likely to correspond to a point on the energy slope of FIG. 4 corresponding to the region 430 where the gradient is negative and corresponding to voltages below the threshold voltage. For this reason, at 654 the core voltage, Vcc, is incremented in an attempt to explore the region to the right of region 430 towards the minimum energy point. However, before incrementing the core voltage, at step 652 the optimal values of voltage and power and frequency count are updated at 652 to correspond to the new values that were set at 630 to reflect the fact that those new values were determined at 640 to have a lower calculated energy per operation than the tentatively set optimal values assigned at 620.

Returning now to the process element 662, once the voltage has been decremented relative to the Vcc set at process element 620, it is determined at 664 whether or not the currently set optimal power, $P_{op}$, results in lower energy consumption than the newly decremented power, $P_{new}$. If it is determined at 664 that $P_{op}$ does in fact involve a lower $E_{per\ op}$ than $P_{new}$, then the process proceeds to 670 where the currently set optimal voltage is finally determined in this cycle to be the MEP point. If, on the other hand, at element 664 it is determined that $P_{new}$ in fact results in a lower energy per operation than the currently set $P_{op}$ then at element 666, the optimal voltage, optimal power and optimal frequency count are set to the new values that were assigned at 662. Subsequently, the process loops back to step 662 to perform a further decrementing of the core voltage and corresponding adjustment to the core frequency until the MEP is located.

Returning to process element 656 on the right-hand branch of the FIG. 6, after the parameters have been incremented at 654, the process goes to 656 to establish whether or not the currently set optimum power results in a lower energy per operation than the newly incremented power $P_{new}$ set at 654. In the event that it is determined at 656 that the newly incremented core frequency and voltage values do result in a lower energy per operation, then the optimal values ($V_{op}$ etc.) are set to those values that were set during the incrementing process 654 and then the process proceeds to further increment the core voltage and to follow the loop 656, 658, 654 on the right-hand side until the minimum voltage of the energy curve is detected.

In the event that it is determined at 656 that the previously set $P_{op}$ has a lower energy than the new the incremented value then the process proceeds to 670 where the value of $P_{op}$ set at 652 is finally determined to correspond to the MEP point and the corresponding $V_{op}$ that was set at 652 is assigned to be the processor optimum voltage. Once the MEP point and the corresponding optimal voltage have been established at 670, the VR 140 of FIG. 1 is set to output the determined optimal voltage corresponding to the MEP and the clock generator 130 is set to provide the corresponding core frequency to implement minimum energy operation (or at least the best estimate thereof).

In the FIG. 6 flowchart, during the initialization at 610, 620 and 630, instead of incrementing the core voltage at 630, Vcc could instead be decremented and the following steps could be adjusted accordingly, taking into account what the relative energy per operation values suggest regarding the Vcc point on the characteristic energy curve of FIG. 4 is currently being explored. The results of the MEP determination may vary depending on, for example, the magnitude of the voltage increments at 630 and 654 and the magnitude of the voltage decrement at 662. In some examples, the increment and decrement values are small in magnitude relative to the magnitude of the core voltage itself. In some examples the voltage step used by the tracking algorithm of FIG. 6 may be around 25 mV to 50 mV, but other values could be used. In some examples the magnitude of the increment or decrement in voltage is the same throughout a process of determining the MEP. However, in other examples, the magnitude of the core voltage increment or decrement may be varied during the process of FIG. 6 to improve the accuracy or efficiency of the MEP determination. For example, a large magnitude increment or decrement could be used to narrow down the location of the MEP whilst a smaller magnitude increment or decrement could be used subsequently to obtain a more precise estimate for a location of the MEP.

If the voltage step is too large then it may lead to coarse tracking of the MEP with the possibility of missing the MEP, whereas if the voltage step is to small it could result in the MEP determining loop settling on a non-minimum voltage due to potential errors involved in computing the relative energy per operation at 640, 664 and 656. However, these errors due to particularly small voltage steps are likely to be reduced relative to the case of calculating and actual value for each individual point representing the energy per operation. Replacing the reciprocal calculation with the frequency count can thus improve the accuracy of the calculation.

The minimum energy tracking algorithm example illustrated in FIG. 6 is effectively a slope-tracking algorithm that makes use of the single minimum and concave nature of the energy per operation versus core voltage curve as illustrated in FIG. 4 and FIG. 5.

Determination of an updated value for an MEP may be calculated periodically or intermittently or in response to detected changes in temperature or workload or both or in response to changes in any other environmental factors or upon processing device powering-up or in any other way or combination of ways as appropriate to increase the energy efficiency of the processing device. Tracking of the MEP may be controlled by the Power Management Unit 140 of FIG. 1 such that the algorithm of FIG. 6 may be re-run multiple times. Re-evaluation of the MEP may be triggered by one or more on-die or off-die sensors, such as the sensors 124 (see FIG. 1), to dynamically readjust the perceived optimum voltage and frequency as operating conditions of at least one of the system 100 or the processing device 120 of the FIG. 1 example arrangement change. Triggering of re-evaluation of the MEP and dynamic adjustment of the optimum operating point of the processing device depending on the determined MEP may depend on a predetermined change in one or more of the operating parameters such as a change in an operating temperature by greater than a threshold magnitude. The processing device may be set to operate at a frequency and voltage corresponding to an optimum operating point at least when the device is in a power-saving mode of operation. The initially set voltage value at 620 may depend on an operating point set by the PMU 140 corresponding to the current processing workload. The MEP may be re-determined, for example, when the core voltage is changed by more than a minimum magnitude by the PMU 140 or when a change to an implemented sleep mode occurs. In some examples, the MEP determination may depend on a mode in which the VR 110 is set to operate.

The functions and operations described in this specification may be performed in various parts of the system. For example, in some embodiments the MEP determination calculations of FIG. 6 may be performed in one or more processors that are in the processing device 120 in FIG. 1, while the PMU 140 merely sends control signals derived by the processor(s). In other embodiments, PMU 140 may perform all the calculations. In still other embodiments, this functionality may be shared between the processor(s) in load 120 and the PMU 140. In some embodiments, PMU 140 and Clock Generator 130 may be powered by V(out), and their energy consumption therefore included in the calculation of formula (1). This is the configuration indicated in FIG. 1. In other embodiments, PMU 140 and/or Clock Generator 130 may not be powered by V(out), and their energy consumption would not be included in the calculation, which might lead to a less-than-optimum result for minimizing energy consumption.

One example where MEP tracking (and residency of a processor operating point with Vopt and Fopt) may be useful is for ultra-low voltage operation in a mode when the processing device is in an "always-on always sensing (AOAS)" mode. Any "Internet of Things" device may use the MEP tracking according to the present technique to increase energy efficiency. The MEP tracking method can be implemented as part of the PMU 140 (see FIG. 1) or may work in together with the PMU 140, to set the optimal voltage and corresponding frequency and to perform runtime MEP tracking utilizing parameters from two different operating points in a cross multiplication to determine a relative energy per operation.

In this specification, the phrase "at least one of A or B" and the phrase "at least one of A and B" and should be interpreted to mean any one or more of the plurality of listed items A, B etc., taken jointly and severally in any and all permutations.

Where functional units have been described as circuitry, the circuitry may be general purpose processor circuitry configured by program code to perform specified processing functions. The circuitry may also be configured by modification to the processing hardware.

Configuration of the circuitry to perform a specified function may be entirely in hardware, entirely in software or using a combination of hardware modification and software execution. Program instructions may be used to configure logic gates of general purpose or special-purpose processor circuitry to perform a processing function.

Circuitry may be implemented, for example, as a hardware circuit comprising processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate arrays (FPGAs), logic gates, registers, semiconductor devices, chips, microchips, chip sets, and the like.

The processors may comprise a general purpose processor, a network processor that processes data communicated over a computer network, or other types of processor including a reduced instruction set computer RISC or a complex instruction set computer CISC. The processor may have a single or multiple core design. Multiple core processors may integrate different processor core types on the same integrated circuit die.

Machine readable program instructions (software) may be provided on a transitory medium such as a transmission medium or on a non-transitory medium such as a storage medium. Such machine readable instructions (computer program code) may be implemented in a high level procedural or object oriented programming language. However, the program(s) may be implemented in assembly or machine language, if desired. In any case, the language may be a compiled or interpreted language, and combined with hardware implementations.

Embodiments of the present technique are applicable for use with all types of semiconductor integrated circuit ("IC") chips. Examples of these IC chips include but are not limited to processors, controllers, chipset components, programmable logic arrays (PLAs), memory chips, network chips, and the like. In some embodiments, one or more of the components described herein may be embodied as a System On Chip (SOC) device. A SOC may include, for example, one or more Central Processing Unit (CPU) cores, one or more Graphics Processing Unit (GPU) cores, an Input/Output interface and a memory controller. In some embodiments a SOC and its components may be provided on one or more integrated circuit die, for example, packaged into a single semiconductor device.

EXAMPLES

The following examples pertain to further embodiments.
1. Circuitry to control a performance level of a processing device depending on two or more operating points of the processing device, wherein an operating point has a corresponding frequency and a corresponding voltage, the performance-level control circuitry arranged to:
   cross-multiply parameters corresponding to a first operating point and a second, different operating point of the processing device;
   determine a relative energy expenditure of the first operating point and the second operating point based on the cross multiplication; and
   select an operating point of the processing device depending on the determined relative energy expenditure.

2. Circuitry of example 1, wherein the relative energy expenditure of the first operating point and the second operating point is a relative energy per operation of the processing device.

3. Circuitry of example 2, wherein an operation comprises one of: a single processing cycle corresponding to the frequency or a predetermined number of processing cycles to complete a processing task unit 4. Circuitry of any one of examples 1 to 3, wherein the performance-level control circuitry comprises at least one frequency counter to accumulate a number of counts in a predetermined reference period at a corresponding operating point and wherein the accumulated count is a multiplicand in the cross multiplication.

5. Circuitry of example 4, wherein a further multiplicand in the cross multiplication is a power expenditure to perform an operation at the corresponding operating point.

6. Circuitry of example 5, wherein the power expenditure is calculated depending on an average current consumed in supplying the processing device over a duration of the operation for which the relative energy expenditure is determined.

7. Circuitry of example 5 wherein the power expenditure is calculated depending on an average current input to a voltage regulator supplying at least the processing device over a duration of the operation for which the relative energy expenditure is determined.

8. Circuitry of example 6 or example 7, wherein the average power consumed is determined by a voltage regulator supplying the processing device and is calculated from a product of a voltage measured by the voltage regulator and an average current measured by the voltage regulator.

9. Circuitry of any one of examples 1 to 8, wherein an optimum operating point for the processing device is determined based on the relative energy expenditure, wherein the optimum operating point corresponds to an estimated location of a Minimum Energy Point, MEP.

10. Circuitry of example 9, wherein to determine the optimum operating point, the first and second operating points for the relative energy determination are selected to have voltage values in the vicinity of a threshold voltage for transistors of the processing device.

11. Circuitry of example 10, wherein the optimum operating point is initially assigned to be one of the first operating point and the second operating point having a lower relative energy expenditure.

12. Circuitry of example 11, wherein following initial selection of the optimum operating point, the operating point selection is fine-tuned by one of incrementing or decrementing the operating point of the processing device and performing a further cross-multiplication using the new operating point and the previously assigned optimum operating point to determine a minimum relative energy between the new operating point and the previously assigned optimum operating point.

13. Circuitry of example 12, wherein the optimum operating point is updated to the new operating point if the new operating point is determined to have a lower energy than the previously assigned optimum operating point.

14. Circuitry of example 12 or example 13, wherein if the fine-tuning direction of incrementing or decrementing the operating point resulted in a new operating point having a lower relative energy expenditure than the initially selected optimum operating point, further fine-tuning is iteratively performed in the same fine-tuning direction to determine a final optimal operating point.

15. Circuitry of example 12 or example 13, wherein if the fine-tuning direction of incrementing or decrementing the operating point resulted in a new operating point having a higher relative energy expenditure than the initially selected optimum operating point, further fine-tuning is iteratively performed in an opposite fine-tuning direction to determine a final optimal operating point.

16. Circuitry of any one of examples 8 to 14, wherein the determination of the optimum operating point from the MEP is triggered by a power management unit of the processing device.

17. Circuitry of example 16, wherein the power management unit is to trigger the determination of the optimum operating point in response to a change in operating conditions of the processing device detected by one or more sensors.

18. An integrated circuit comprising the circuitry of any one of examples 1 to 14.

19. An apparatus comprising:
a processing device;
a power management unit to manage power supplied to the processing device;
a voltage regulator to be controlled by the power management unit to supply an operating voltage to the processing device; and
performance level control circuitry according to any one of examples 1 to 17.

20. Apparatus of example 19 wherein an optimum operating point for the processing device is determined based on the relative energy expenditure, wherein the optimum operating point corresponds to an estimated location of a Minimum Energy Point, MEP and wherein the power management unit is arranged to set the processing device operating point to the optimum operating point.

21. Apparatus of example 19, wherein the performance level control circuitry is implemented at least in part in one of the voltage regulator and the processing device.

22. Apparatus of any one of examples 19 to 21 provided on a single integrated circuit die.

23. Apparatus as specified in example 20, comprising at least one sensor, wherein the power management unit is to trigger the determination of the optimum operating point in response to a change in operating conditions of the processing device detected by the at least one sensor.

24. Machine-readable instructions provided on a tangible or non-tangible storage medium for execution on one or more processors to cause the one or more processors to:
cross-multiply parameters corresponding to a first operating point and a second, different operating point of a processing device, wherein an operating point has a corresponding frequency and a corresponding voltage;
determine a relative energy expenditure of the first operating point and the second operating point based on the cross multiplication; and
select an operating point of the processing device depending on the determined relative energy expenditure.

25. Machine-readable instructions as specified in example 23, wherein an optimum operating point is determined based on the relative energy expenditure, the optimum operating point corresponding to an estimated location of a Minimum Energy Point, MEP, for the processing device.

26. Machine-readable instructions as specified in example 25, wherein the determination of the optimum operating point is triggered responsive to a change in operating conditions of the processing device.

27. Method of controlling a performance level of a processing device comprising:
cross-multiplying parameters corresponding to a first operating point and a second, different operating point of a processing device, wherein an operating point has a corresponding frequency and a corresponding voltage;
determining a relative energy expenditure of the first operating point and the second operating point based on the cross multiplication; and
selecting an operating point of the processing device depending on the determined relative energy expenditure.

28. Method of example 27, wherein the relative energy expenditure of the first operating point and the second operating point is a relative energy per operation of the processing device.

The invention claimed is:

1. Circuitry to control a performance level of a processing device depending on two or more operating points of the processing device, wherein an operating point has a corresponding frequency and a corresponding voltage, the performance-level control circuitry includes:
circuitry to cross-multiply parameters corresponding to a first operating point and a second, different operating point of the processing device;
circuitry to determine a relative energy expenditure of the first operating point and the second operating point based on the cross multiplication; and
circuitry to select an operating point of the processing device depending on the determined relative energy expenditure.

2. The circuitry of claim 1, wherein the relative energy expenditure of the first operating point and the second operating point is a relative energy per operation of the processing device.

3. The circuitry of claim 2, wherein an operation comprises one of a single processing cycle corresponding to the frequency or a predetermined number of processing cycles to complete a processing task unit.

4. The circuitry of claim 1, wherein the performance-level control circuitry comprises at least one frequency counter to accumulate a number of counts in a predetermined reference period at a corresponding operating point and wherein the accumulated count is a multiplicand in the cross multiplication.

5. The circuitry of claim 4, wherein a further multiplicand in the cross multiplication is a power expenditure to perform an operation at the corresponding operating point.

6. The circuitry of claim 5, wherein the power expenditure is calculated depending on an average current consumed in supplying the processing device over a duration of the operation for which the relative energy expenditure is determined.

7. The circuitry of claim 5 wherein the power expenditure is calculated depending on an average current input to a voltage regulator supplying at least the processing device over a duration of the operation for which the relative energy expenditure is determined.

8. The circuitry of claim 6, wherein the average power consumed is determined by a voltage regulator supplying the processing device and is calculated from a product of a voltage measured by the voltage regulator and an average current measured by the voltage regulator.

9. The circuitry of claim 1, wherein an optimum operating point for the processing device is determined based on the relative energy expenditure, wherein the optimum operating point corresponds to an estimated location of a Minimum Energy Point, MEP.

10. The circuitry of claim 9, wherein to determine the optimum operating point, the first and second operating points for the relative energy determination are selected to have voltage values in the vicinity of a threshold voltage for transistors of the processing device.

11. The circuitry of claim 10, wherein the optimum operating point is initially assigned to be one of the first operating point and the second operating point having a lower relative energy expenditure.

12. The circuitry of claim 11, wherein following initial selection of the optimum operating point, the operating point selection is fine-tuned by one of incrementing or decrementing the operating point of the processing device and performing a further cross-multiplication using the new operating point and the previously assigned optimum operating point to determine a minimum relative energy between the new operating point and the previously assigned optimum operating point.

13. The circuitry of claim 12, wherein the optimum operating point is updated to the new operating point if the new operating point is determined to have a lower energy than the previously assigned optimum operating point.

14. The circuitry of claim 12, wherein if the fine-tuning direction of incrementing or decrementing the operating point resulted in a new operating point having a lower relative energy expenditure than the initially selected optimum operating point, further fine-tuning is iteratively performed in the same fine-tuning direction to determine a final optimal operating point.

15. An apparatus comprising:
a processing device;
a power management unit to manage power supplied to the processing device;
a voltage regulator to be controlled by the power management unit to supply an operating voltage to the processing device; and
performance level control circuitry to:
cross-multiply parameters corresponding to a first operating point and a second, different operating point of the processing device;
determine a relative energy expenditure of the first operating point and the second operating point based on the cross multiplication; and
select an operating point of the processing device depending on the determined relative energy expenditure.

16. The apparatus of claim 15 wherein an optimum operating point for the processing device is determined based on the relative energy expenditure, wherein the optimum operating point corresponds to an estimated location of a Minimum Energy Point, MEP and wherein the power management unit is arranged to set the processing device operating point to the optimum operating point.

17. The apparatus of claim 15, wherein the performance level control circuitry is implemented at least in part in one of the voltage regulator and the processing device.

18. The apparatus of claim 15 provided on a single integrated circuit die.

19. The apparatus of claim 16, comprising at least one sensor, wherein the power management unit is to trigger the determination of the optimum operating point in response to a change in operating conditions of the processing device detected by the at least one sensor.

20. Machine-readable instructions provided on a tangible storage medium for execution by one or more processors to cause the one or more processors to:
cross-multiply parameters corresponding to a first operating point and a second, different operating point of a processing device, wherein an operating point has a corresponding frequency and a corresponding voltage;
determine a relative energy expenditure of the first operating point and the second operating point based on the cross multiplication; and
select an operating point of the processing device depending on the determined relative energy expenditure.

21. The machine-readable instructions as claimed in claim 19, wherein an optimum operating point is determined based on the relative energy expenditure, the optimum operating point corresponding to an estimated location of a Minimum Energy Point, MEP, for the processing device.

22. The machine-readable instructions as claimed in claim 21, wherein the determination of the optimum operating point is triggered responsive to a change in operating conditions of the processing device.

23. A method of controlling a performance level of a processing device, the method comprising:
cross-multiplying parameters corresponding to a first operating point and a second, different operating point of a processing device, wherein an operating point has a corresponding frequency and a corresponding voltage;
determining a relative energy expenditure of the first operating point and the second operating point based on the cross multiplication; and
selecting an operating point of the processing device depending on the determined relative energy expenditure.

24. The method of claim 23, wherein the relative energy expenditure of the first operating point and the second operating point is a relative energy per operation of the processing device.

* * * * *